US009169032B2

(12) United States Patent
Gengerke

(10) Patent No.: US 9,169,032 B2
(45) Date of Patent: Oct. 27, 2015

(54) LOAD FILL SENSOR SYSTEM FOR GRAIN STORAGE VESSELS

(71) Applicant: LEADING EDGE INDUSTRIES, INC., Groton, SD (US)

(72) Inventor: Shawn L. Gengerke, Groton, SD (US)

(73) Assignee: S7 IP Holdings, LLC, Groton, SD (US)

( * ) Notice: Subject to any disclaimer, the term of this patent is extended or adjusted under 35 U.S.C. 154(b) by 0 days.

(21) Appl. No.: 14/700,542

(22) Filed: Apr. 30, 2015

(65) Prior Publication Data

US 2015/0259083 A1 Sep. 17, 2015

Related U.S. Application Data

(60) Division of application No. 13/916,762, filed on Jun. 13, 2013, now Pat. No. 8,085,381, and a continuation-in-part of application No. 13/571,867, filed on Aug. 10, 2012, now abandoned, and a continuation-in-part of application No. 13/398,931, filed on Feb. 17, 2012, now abandoned.

(51) Int. Cl.
*G08B 21/00* (2006.01)
*B65B 1/30* (2006.01)
*G01D 7/00* (2006.01)

(52) U.S. Cl.
CPC ... *B65B 1/30* (2013.01); *G01D 7/00* (2013.01)

(58) Field of Classification Search
None
See application file for complete search history.

(56) References Cited

U.S. PATENT DOCUMENTS

| 3,831,159 A | 8/1974 | Parsons |
| 4,008,816 A | 2/1977 | Harrison |
| 4,043,199 A | 8/1977 | Greer |
| 4,047,434 A * | 9/1977 | Marsh .................. G01F 23/241 73/304 R |
| 4,396,911 A * | 8/1983 | Motsinger ........... G01F 23/2885 250/577 |
| 4,410,886 A | 10/1983 | Motsinger |
| 4,614,477 A | 9/1986 | Hagenbuch |

(Continued)

FOREIGN PATENT DOCUMENTS

| EP | 1410947 A2 | 4/2004 |
| JP | 05-231771 A1 | 9/1993 |
| KR | 20-2011-0004197 U | 4/2011 |

OTHER PUBLICATIONS

Agrawal and Jain, "An Overview of Tactile Sensing", Robotics Research Laboratory, Dept. of Electrical Engineering and Computer Science, The University of Michigan, Ann Arbor, MI; Jul. 1986.

*Primary Examiner* — Travis Hunnings
(74) *Attorney, Agent, or Firm* — Nikolai & Mersereau, P.A.; Thomas J. Nikolai

(57) ABSTRACT

A system for remotely indicating the level of grain being loaded into a grain trailer. Plural vertically oriented sensing strips are affixed to a trailer's hopper(s) sidewall of the trailer's hopper(s) at spaced locations. Signals from transducer elements on the strips are delivered to an electronics module on the trailer's forward wall. The electronics module includes a multiplexer for sampling the state of the strip transducers and a wireless transmitter for relaying the state data to a receiver and microprocessor in the cab of a towing vehicle. The microprocessor presents a visual display of height reached by the grain in a hopper as loading continues. Following system calibration where a pixel count of the load being displayed and a measured net weight of the load are determined using a scale, a calibration factor corresponding to the weight-per-pixel is stored for use in computing the weight and volume of subsequent loads.

6 Claims, 13 Drawing Sheets

(56) References Cited

U.S. PATENT DOCUMENTS

| | | | |
|---|---|---|---|
| 5,473,234 A * | 12/1995 | Richardson | B65G 43/08 318/479 |
| 5,800,262 A | 9/1998 | Andersen | |
| 6,074,298 A | 6/2000 | Majkrzak | |
| 6,769,313 B2 | 8/2004 | Weiss | |
| 8,032,255 B2 | 10/2011 | Phelan | |
| 9,085,381 B2 * | 7/2015 | Gengerke | B65B 1/32 1/1 |
| 2002/0121905 A1 * | 9/2002 | Salmon, Jr. | G01F 23/161 324/602 |
| 2004/0184889 A1 | 9/2004 | Rexius et al. | |
| 2006/0151217 A1 | 7/2006 | Mill | |
| 2007/0039384 A1 | 2/2007 | Smith | |
| 2009/0139436 A1 * | 6/2009 | Memory | A01C 7/105 111/130 |
| 2009/0207032 A1 | 8/2009 | Gunthorpe et al. | |
| 2010/0042297 A1 | 2/2010 | Foster | |
| 2010/0155415 A1 * | 6/2010 | Ashrafzadeh | B67D 1/001 222/1 |
| 2010/0274452 A1 | 10/2010 | Ringwald | |
| 2011/0103901 A1 | 5/2011 | Hetcher et al. | |
| 2013/0269832 A1 * | 10/2013 | Gengerke | B65B 1/32 141/95 |

\* cited by examiner

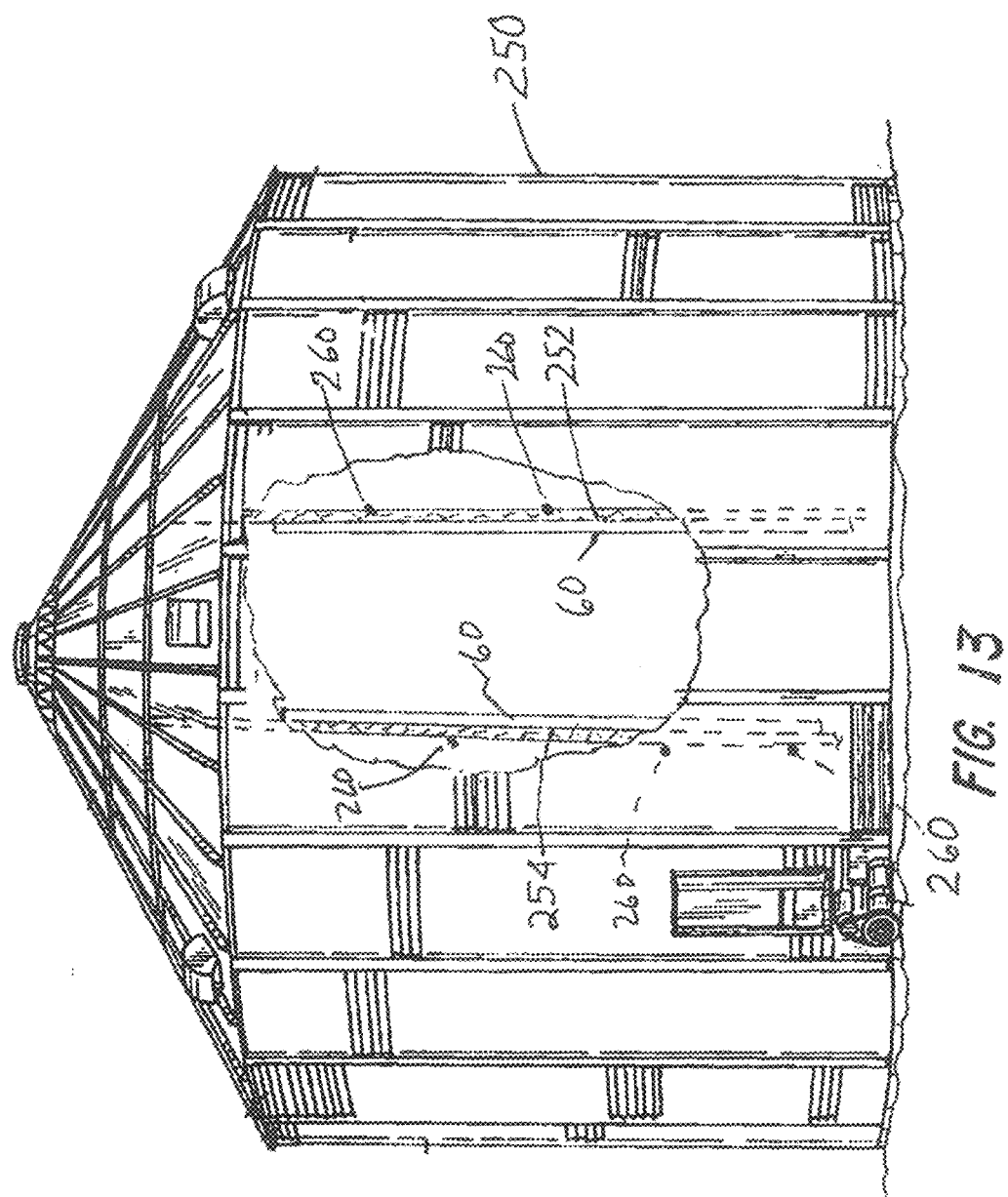

LOAD FILL SENSOR SYSTEM FOR GRAIN STORAGE VESSELS

CROSS-REFERENCE TO RELATED APPLICATION

This application is a divisional application of a continuation-in-part application claiming priority to U.S. application Ser. No. 13/916,762, filed Jun. 13, 2013, which is a continuation-in-part application claiming priority to U.S. application Ser. No. 13/571,867, filed Aug. 10, 2012, which is a continuation-in-part of application Ser. No. 13/398,931, filed Feb. 17, 2012.

BACKGROUND OF THE INVENTION

1. Field of the Invention

This invention relates generally to monitoring apparatus for mobile bulk material transport systems and stationary storage bins, and, more particularly, to apparatus for monitoring the level of grain as it is being loaded into the hopper(s) of a grain trailer or into a grain storage vessel.

2. Discussion of the Prior Art:

In farming operations, grains such as corn, soybeans, wheat, etc. are commonly stored by the farmer in storage bins for later transport to a commercial elevator operation as market conditions may dictate. Exemplary storage bins may range in size from 15-54 feet in diameter and capacities up to nearly 66,000 bushels. When an appropriate shipment time is decided, the farmer must load a grain trailer from the storage bin, typically using an auger for moving the grain from the storage bin to the grain trailer.

Grain trailers may typically range in length from 30 feet to 50 feet and they include one or more hoppers. The trailers are typically 8 feet wide and may have sidewalls 6½ feet high. Arcuate gable rods span the width dimension of the trailer at spaced intervals along its length. The gable rods support a roll-back canvass cover which can be manipulated from the ground using a crank arrangement for operating a roller aligned with one sidewall of the trailer.

The trailer may have multiple axe's and each hopper has an outlet at its bottom with a slidable door whereby a load can be emptied out the bottom of the trailer by sliding the door to its open position. The hoppers, of course, have inwardly and downwardly sloping inner sidewalls so as to funnel the load to the outlet.

When loading a trailer of the type described, the farmer will typically drive the semi-tractor used to pull the trailer such that a front most one of the hoppers is disposed beneath the storage bin unloading auger and will allow the grain to pour from the auger into the selected hopper. Because the farmer cannot directly view the grain level reached in the hoppers as they are being filled, he must periodically leave the tractor cab and mount a ladder on the trailer to peer through the open top of the trailer and observe so as to prevent overfilling and spillage. At an appropriate time, he must again drive the truck and trailer forward with respect to the auger so that a next hopper can be filled.

When it is recognized that the grain spilling into a trailer is a source of considerable dust, visually observing the load as it builds up in the hoppers is a dirty, distasteful job. Also, the need to repeatedly mount and dismount the ladder can become tiring and is a source of injury.

It can be seen, then, that a need exists for a way to monitor the filling of a grain trailer from a position within the truck's cab so that the farmer will know when it is necessary to move the trailer relative to the auger being used to load the trailer hopper(s). The present invention fulfills this need. It is also desirable that the farmer know the number of bushels he has loaded and the weight of the load to be taken to a commercial elevator for sale. The present invention provides this information, as well.

SUMMARY OF THE INVENTION

One embodiment of the present invention comprises a grain trailer loading monitoring system that allows a driver to visualize how full a hopper of a grain trailer is from a remote location. In accordance with a preferred embodiment, a plurality of elongated sensing strips is vertically mounted at spaced apart locations along one sidewall of each of the hoppers of the trailer. Each of these sensor strips comprises a plurality of regularly spaced transducer elements along its length dimension and conductors leading from each of the transducer elements to an electrical connector at the end thereof. In accordance with one embodiment, the transducer elements are tactile sensors and in an alternative embodiment, the transducer elements comprise opto-electronic devices. A battery powered wireless transmitter module is mounted to the forward end of the trailer and connected to the transducer sensing strips by cabling. Within the cab of the semi-tractor used to pull the trailer is a computer terminal with a display screen and a wireless receiver tuned to receive data signals from the wireless transmitter module on the trailer. As the level of grain rises in the hopper, signals from impacted ones of the transducer elements are relayed from the transmitter module to the receiver. The computer is programmed to provide a real-time virtual image corresponding to the level the grain has reached in a hopper compared to the top edge of the trailer sidewalls. In this way, the driver will know when he/she must move the vehicle to position a still empty hopper relative to the outlet of the filling auger without the need for physically viewing the load from a trailer mounted ladder.

In is a further embodiment, the sensor strips may be affixed to the interior wall of a grain storage bin or located on steel cables suspended from the roof structure and used to assess the volume of grain loaded into the bin or removed from it. In addition, the computer employed can be used to wirelessly control the gate and augers used when removing grain from the bin.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 13 illustrates sensor cables suspended within a grain bin.

DESCRIPTION OF THE PREFERRED EMBODIMENT

Figure 1:
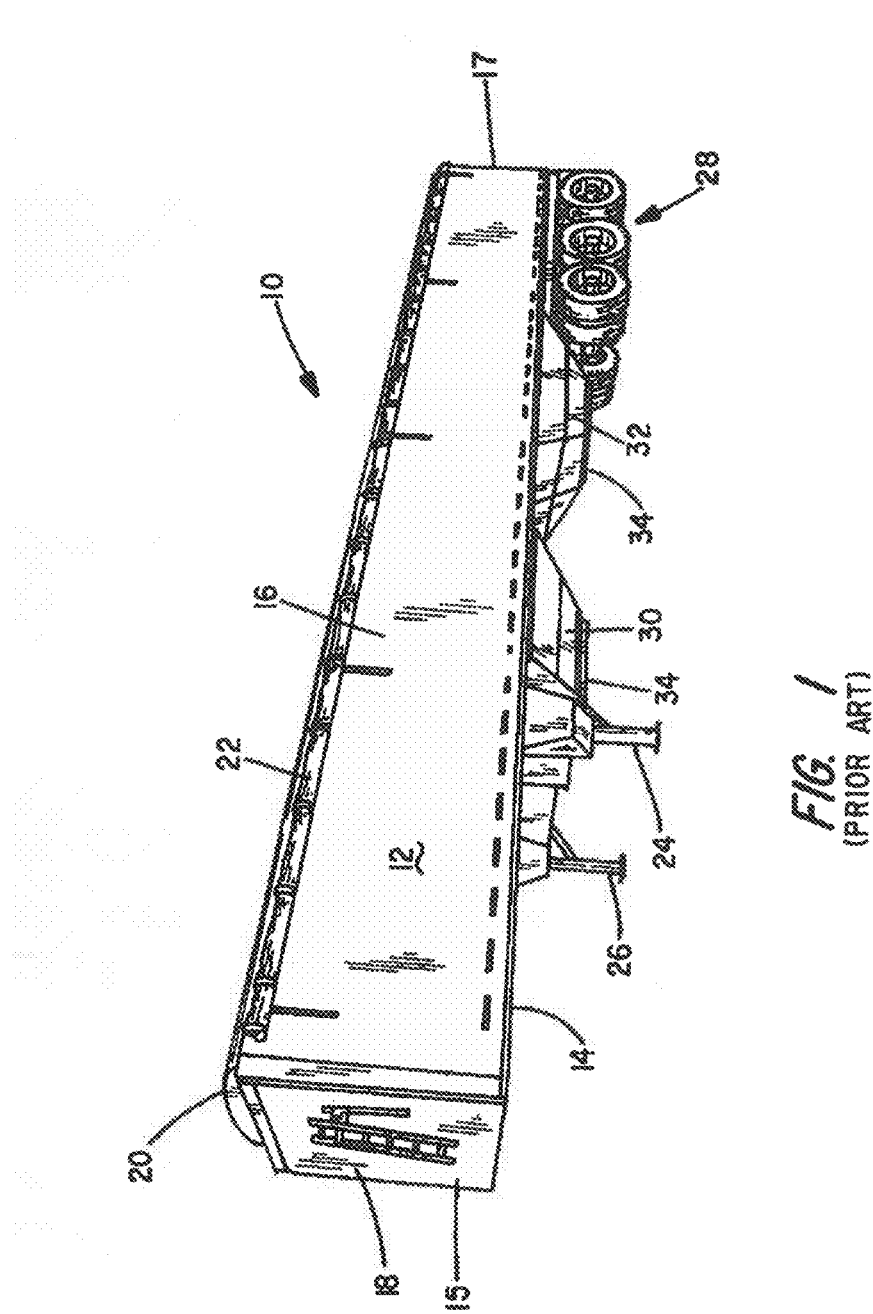
FIG. 1 is a perspective view of a grain trailer in which the present invention may be installed.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring to FIG. 1, there is shown a perspective view of a typical in trailer used for transporting bulk grain over a highway. The trailer, indicated generally by numeral 10, has a trailer body 12, having a bottom or bed 14 which is typically about 8 feet in width for highway travel and may range in length from 30 ft. to 50 ft. or more. Projecting perpendicularly upward from the bottom or bed 14 are a driver side sidewall 16 and a passenger side sidewall 18, each of the sidewalls terminating in an open top. The trailer has a front wall 15 and a rear wall 17. Bridging the upper edges of the sidewalls 16 and 18 are a series of longitudinally spaced gable struts, as at 20. These gable struts rise above the upper edges of the sidewalls and are sloped or rounded. Covering the open top and supported by the gable struts 20 is a canvass sheet 22 which when in its closed disposition follows the contours of the arcuate gable struts 20 so that rainwater will roll off the canvass top.

As is conventional, the canvass top 22 is secured to a roller which runs the length of the trailer along one upper edge of a sidewall and is adapted to be rotated by a person turning a crank at the rear end of the trailer for deploying and removing the cover.

Missing from FIG. 1 is the semi-tractor used to tow the trailer 10. As such, the trailer is shown supported proximate its front end by deployable, hydraulically actuated landing gears 24, 26 and at its rear end by wheels mounted on plural axles, as shown generally at 28.

With continued reference to FIG. 1, the trailer depicted therein is seen to have dual hoppers 30 and 32 with inwardly and downwardly sloping walls terminating at a discharge opening that can be closed or opened by sliding doors 34 which also may be hydraulically actuated using a suitable hydraulic ram.

Figure 2:
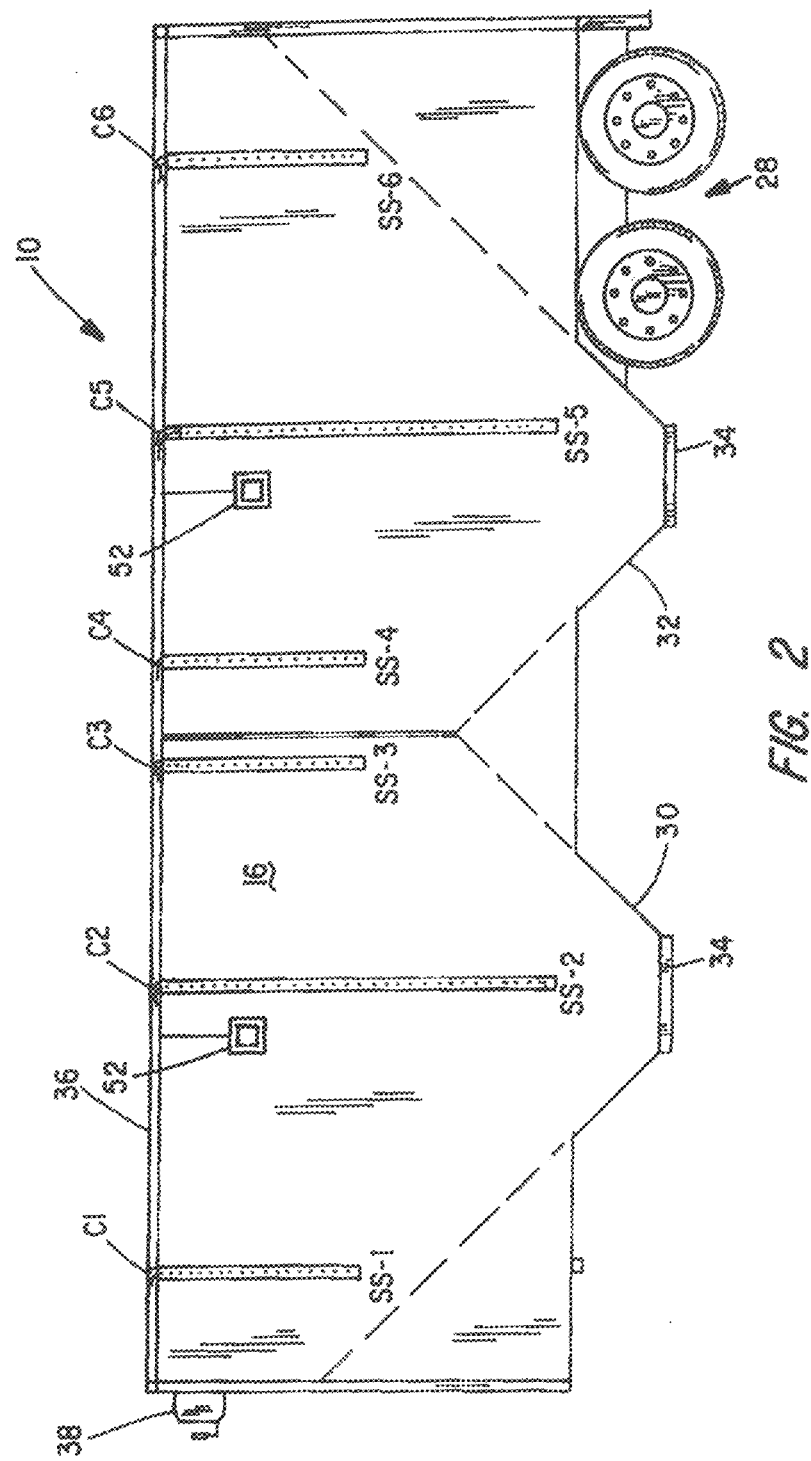
FIG. 2 is a diagram showing a dual hopper grain trailer with tactile sensor strips affixed to the sidewall of each of the hoppers.

FIG. 2 can be considered as a longitudinally cross-sectioned view of the trailer of FIG. 1 and looking at the interior of the driver side sidewall 16. The dashed lines shown in FIG. 2 are intended to illustrate the sloping walls of the hopper compartments and shown affixed to the interior sidewalls of each of the hoppers is a plurality of sensing strips labeled SS-1 through SS-6. The sensing strips SS-2 and SS-5 are generally centrally located within each of the hoppers and are somewhat longer than their adjacent strips. Without limitation, the sensing strips SS-2 and SS-5 may be appropriately 65 in. in length while sensing strips SS-1, SS-3, SS-4 and SS-6 may each be about 48 in. in length.

In accordance with one embodiment, the sensing strips may each comprise a flexible substrate that is adapted to be adhesively bonded to the trailer's interior sidewall and preferably, but not necessarily, may incorporate a piezoelectric polymer, such as polyvinylidene fluoride (PVDF). Each of the strips includes plural separate areas that are regularly spaced along its length and that support PVDF film elements thereon. While PVDF film transducers described above are admirably suited to the preferred embodiment, other sensor devices known in the art can be applied. For example, diaphragm tactile switches, dome switches and other pressure sensitive switches may be used as the transducers. Internal conductors within the strips couple the individual transducer elements to electrical connectors $C_1$ through $C_6$ on the strips SS-1 through SS-6. These connectors permit cabling 36 to connect the individual transducer elements in the several strips to an electronics module 38 which may conveniently be mounted on the front end of the trailer. Sensor strips suitable for the present grain trailer use are commercially available from Piezotech S.A.S, of Hesingue, France.

Figure 3:
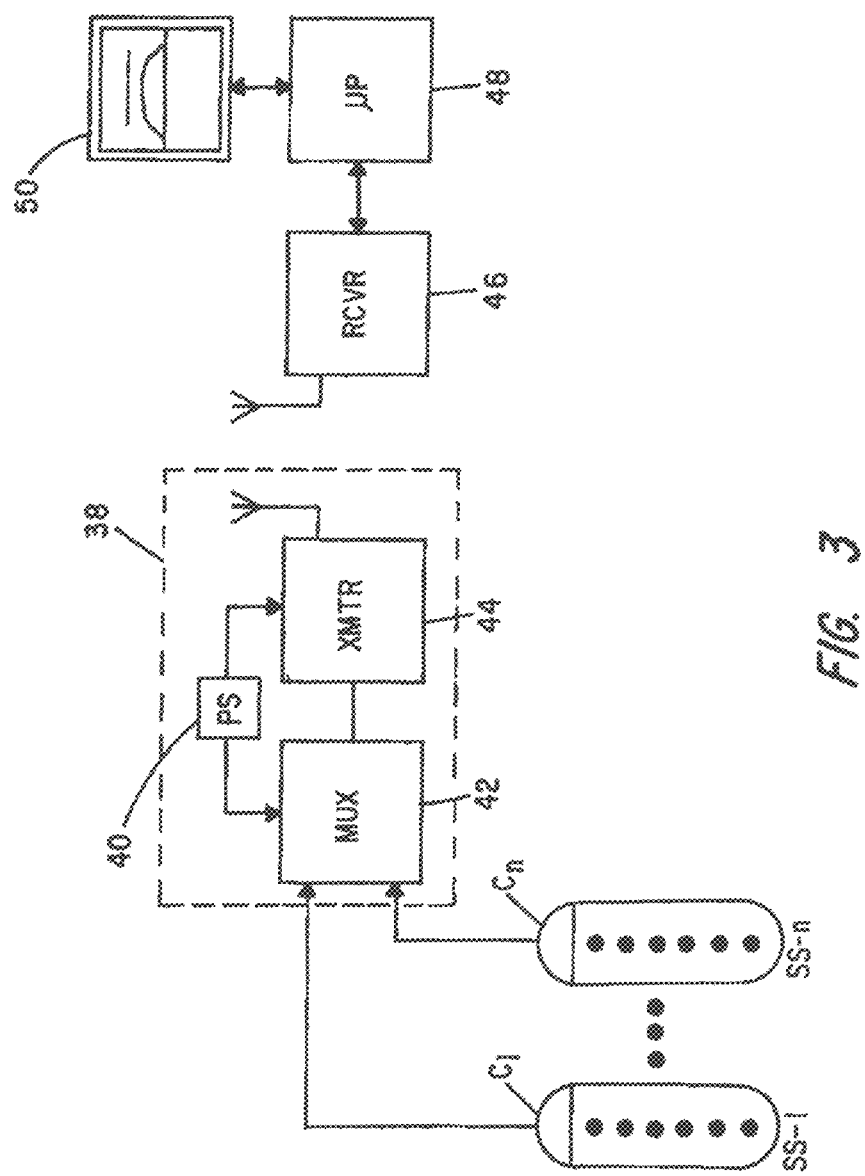
FIG. 3 is a schematic block diagram of the system of the present invention.
Figure 4:
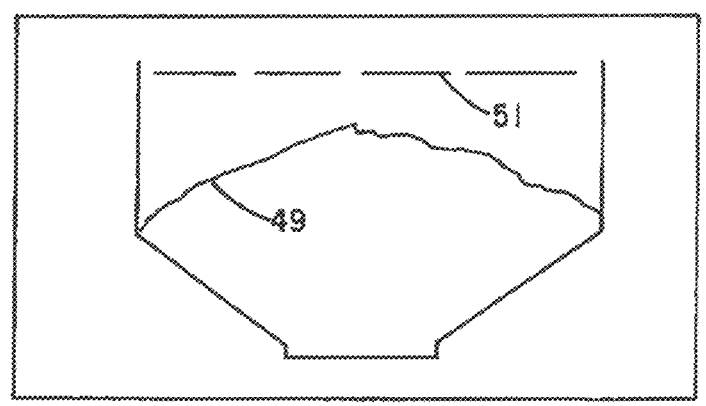
FIG. 4 represents the image of a trailer fill level profile obtained with the system.

As seen in FIG. 3, the module 38 comprises a power supply 40, preferably a 12 volt battery, used to energize a multiplexer 42 and a wireless transmitter 44. The multiplexer 42 is designed to continuously step through and sample each of the piezoelectric transducer elements in the tactile sensor strips SS-1 through SS-n and transmit state information, via a wireless transmitter 44, to a remotely located receiver 46 that may be conveniently mounted in the semi-tractor used to pull the trailer 10. In this regard, the wireless transmitter and receiver may be based upon Bluetooth radio technology that uses frequency-hopping, spread-spectrum, which chops up the data being sent and transmits chunks of it on up to 79 bands in the range of 2400.0 to 2483.5 MHz. As those skilled in the art appreciate, Bluetooth is a packet-based protocol with a master-slave structure. Packet exchange is based on the basic clock, defined by the master, which ticks at 312.5 microsecond intervals. The Bluetooth protocol provides a secure way to connect and exchange information between devices, such as mobile phones, smart phones, laptops, personal computers, tablet computers, GPS receivers and the like. The communication may also be via a Wi-Fi Internet connection or Android based touch screen devices or a Microsoft Windows® smart device if a suitable microprocessor is incorporated into the electronics module 38.

Information received by the receiver 46 is then passed on to a microprocessor 48 to which a graphics display 50 is connected. The microprocessor is programmed so as to present a visual display of the changing level of grain as it is being augured into one of the hopper compartments of the trailer 10. From what has been described thus far, it can be appreciated that as the level of grain rises in a hopper compartment, progressively higher ones of the contact sensing transducers in the sensing strips SS-1 through SS-n are impacted by the grain and thereby produce a signal output which is sampled by the multiplexer 42 and sent via the transmitter 44 to the receiver 46 and microprocessor 48 located in the towing truck cab. The receiver/microprocessor combination may be iPad, iPod, a mobile phone or any of a number of Android-based hand-held devices. The level indicator line 49 presented on the display moves upward until it approaches a fixed indicator 51 corresponding to the elevation of the upper sidewall edges of the trailer. In this fashion, the driver can move the trailer relative to the supply auger to avoid overfilling of a hopper.

Those skilled in the art will appreciate that the present invention can be readily installed in a grain trailer in that the sensing strips can be provided with an adhesive backing, allowing them to be readily affixed to the trailer sidewall with their connector terminals connected by cabling to the box 38 attachable to the front wall of the trailer. Moreover, the 12 volt supply for the electronics preferably comprises the tractor's battery that connects by cabling to the trailer's lights and to the electronic module 38.

As a further feature of the present invention, a read-out of the moisture content of the grain being loaded into a grain trailer for transport can be communicated to the computer in the vehicle cab for storage and later read out at a grain elevator installation where delivery is being made. In this regard, it has been found convenient to install a Harvest Master 800, a product of Juniper Systems of Logan, Utah. Those skilled in the art will appreciate that other electronic moisture sensing devices may be employed and that limitation to the HM 800 device is not intended.

The sensor module 52 can be affixed to the trailer wall in a position to receive a flow of grain through it as it is being loaded into the trailer. The resulting analog output from the sensor is then digitized in an A to D converter in electronics module 38 and the digital values can be wirelessly transmitted over a Wi-Fi link or via Bluetooth to the device 48 (FIG. 3) for recording and later readout.

It is also contemplated that a video camera may be mounted on the front end of the trailer looking rearward to aid a driver in initially positioning the trailer relative to the outlet spout of a power head associated with a grain storage bin for conveying grain from ground level to the open top of the trailer. However, because of the dusty environment, video cameras are not recommended.

Figure 5:
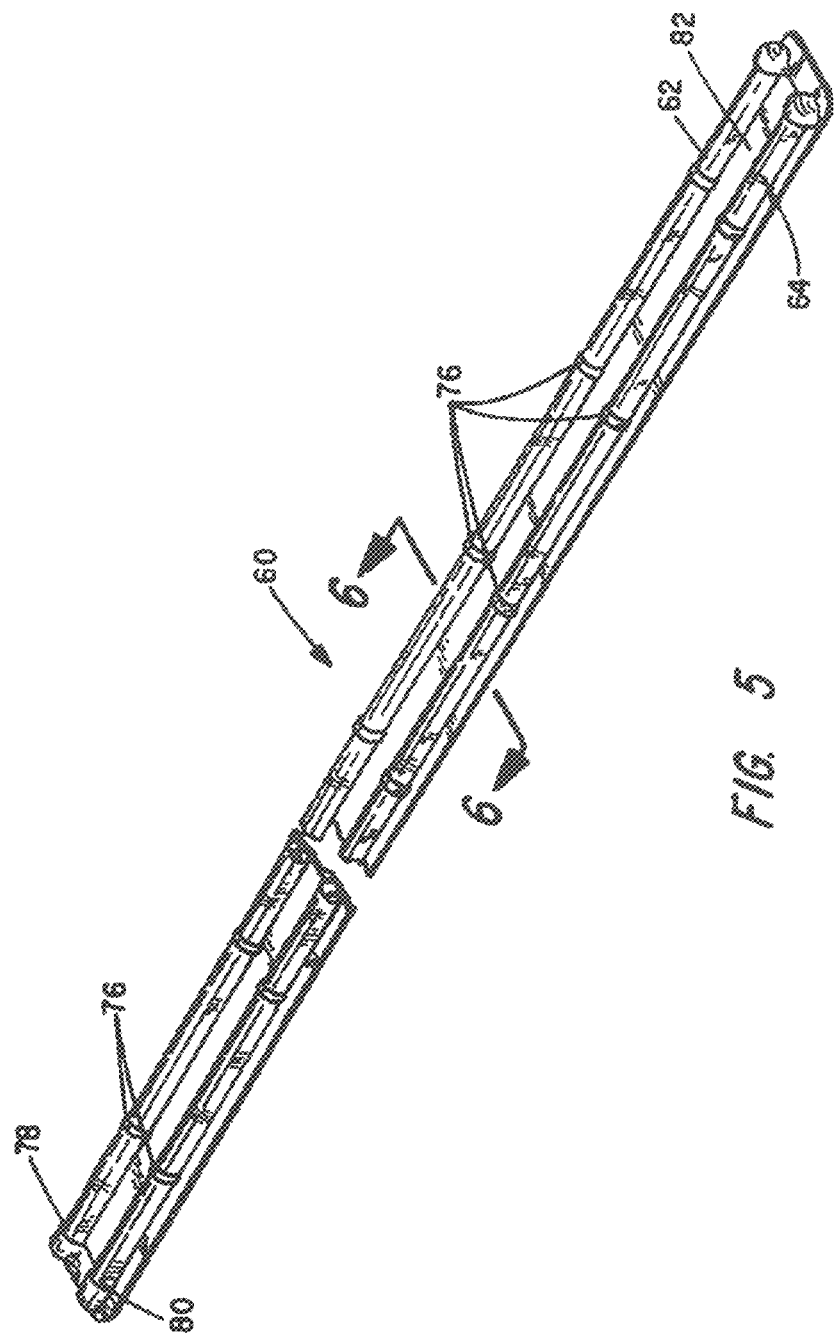
FIG. 5 is a perspective view of opto-electronic sensor pairs replacing the tactile sensor strips of FIG. 2.
Figure 6:
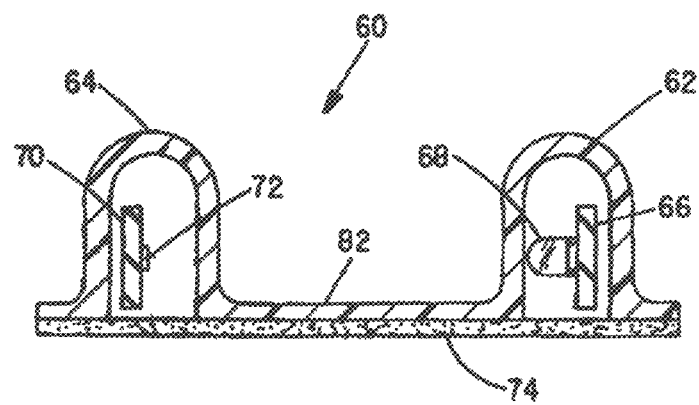
FIG. 6 is a cross-section through the optical source/sensor pair taken along line 6-6 in FIG. 5.

FIG. 5 is a perspective view of an alternative embodiment sensing strip adapted for attachment to the walls of a particulate material containment apparatus such as a grain trailer or storage bin and FIG. 6 is a cross-sectional view taken along line 6-6 of FIG. 5.

Referring to FIG. 5, a molded or extruded tubular housing 60 of a transparent plastic, such as Lexan$^R$ polycarbonate, defines a pair of parallel, spaced-apart chambers 62 and 64. Chamber 62 contains an elongated printed circuit 66 (FIG. 6) having a plurality of regularly longitudinally spaced LED light sources 68. It is preferred that the LED light sources emit at wavelengths in the green portion of the spectrum at about 520 nm. Chamber 64 contains a printed circuit 70 containing a plurality of semiconductor opto-sensors 72. The arrangement is such that there is one sensor 72 aligned horizontally across from each LED light source 68 along the length of the sensor strip. The chambers are closed off by a strip of VHB tape 74 which is used to fasten the strip 60 to a container wall surface and to seal the chambers 62 and 14. It is also found convenient to provide molded plastic clips, as at 76 (FIG. 5) within the housing chambers at spaced intervals to maintain the printed circuitry stable within the housing. Electrical connectors 78, 80 are affixed to one end of the elongated housing, allowing power to be brought to the LED light sources and data to be read from the opto-sensors. The term "printed circuits" as used herein includes various known technologies, including but not limited to, use of surface mount and thru-hole component technologies electrically connected by leaded solders, lead-free solders and other conductors.

The channel 82 formed between the chambers 62 and 64 is open such that particulate material, e.g., corn or other grain, can pass into and along the channel as the containment apparatus, be it a trailer hopper or a storage bin, is being loaded.

As material builds up in the channel 82, the light reaching ones of the opto-sensors 72 will change and a digital output is produced that is a measure of the light impinging on the sensors, which may be daylight or light from an associated LED source or a combination of both. To distinguish whether a light level change is due to the presence of particulate at a given level in channel 82 or due to, say, dust or debris or overhead clouds, two measurements may be taken, one with the LED illuminated and one with the LED off. If the same approximate reading is obtained from each measurement, it is known that it is the presence of particulate material in the channel 82 between the LED source and its associated sensor and not due to changes in ambient light.

Without limitation, the LED light sources 68 may comprise Part No. ALMD-CM3DXZ002 green LEDs exhibiting a predominant wavelength of 525 mm, and available from Avago Technologies of Singapore. That company also supplies a Model APDS-9300 photo-sensor that converts light intensity in the visible spectrum to a digital signal output capable of direct I$^2$C interface that is well suited to the present application. The I$^2$C protocol provides excellent support for communication with various slow, onboard, peripheral devices that are intermittently accessed and is compatible with two-wire serial bus for serial transmission of 8-bit bytes of data plus a 7-bit address and control bits. Those desiring additional information on the APDS-9300 photo sensor and its associated communications protocol are referred to the product Data Sheets (Copyright 2008) available at www.avagotech.com, the contents of which are hereby incorporated by reference.

Persons skilled in the art can appreciate that as grain builds up in the trailer, different light source/sensor pairs 68/72 will be impacted by the presence of dust and grain therebetween. The microprocessor is programmed to execute an algorithm that takes into account past and present light levels detected by the opto-sensors 68 to distinguish between (1) an air gap, (2) a dusty air gap, or (3) a grain filled gap so as to present a graphical output on the display screen indicative of the level of grain within the trailer hoppers as they are being loaded. As with the earlier described embodiment, the driver can determine from within the cab when the level is nearing a filled condition so appropriate action may be taken.

Figure 7:
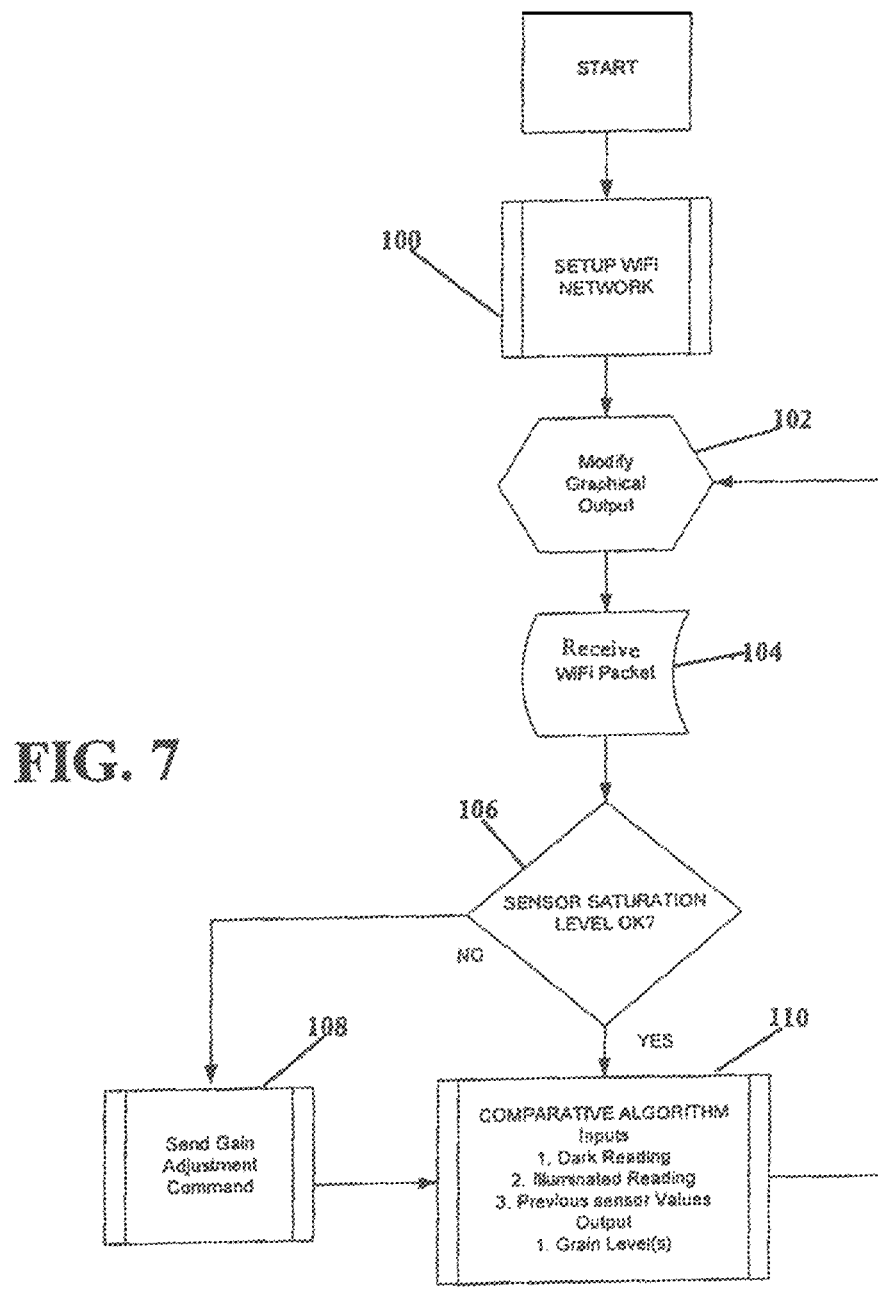
FIG. 7 is a software flow diagram depicting the algorithm executed by the processor in creating a display of the fill status of a grain trailer utilizing opto-electronic sensing strips.

FIG. 7 is a software flow diagram of the algorithm executed by the processor in the electronics module. As already mentioned, the APDS-9300 sensors comprise a pair of A-to-D converters providing outputs indicative of light intensity levels. At block 100, a Wi-Fi network is initialized providing IP addresses and the protocol for communication. At block 102 a determination is made on how many sensor strips (three or six) are included on the trailer to help animate the display of the iPhone or iPad or other device being employed in the vehicle cab. Block 104 merely indicates that a transmitted Wi-Fi packet is received by the receiver in the cab. A test is then made at block 106 as to whether the display is availing itself of all of the resolution available and, if not, the gain (saturation) is adjusted at block 108 before the comparison is made at block 110 of the sensor values with the LEDs off and the LEDs illuminated to the previous sensor values observed to determine if the grain level has progressed to a point where a higher sensor in a strip has been reached and the displayed value is adjusted accordingly back at block 102. In this way, the grain level display is periodically updated to display a current level while false readings due to dust are effectively eliminated.

In addition to providing a graphical display of the level being reached as grain or other bulk commodity is being loaded into a transport trailer, the system of the present invention can be used to control the rate at which the material is being added to the trailer.

Figure 8:
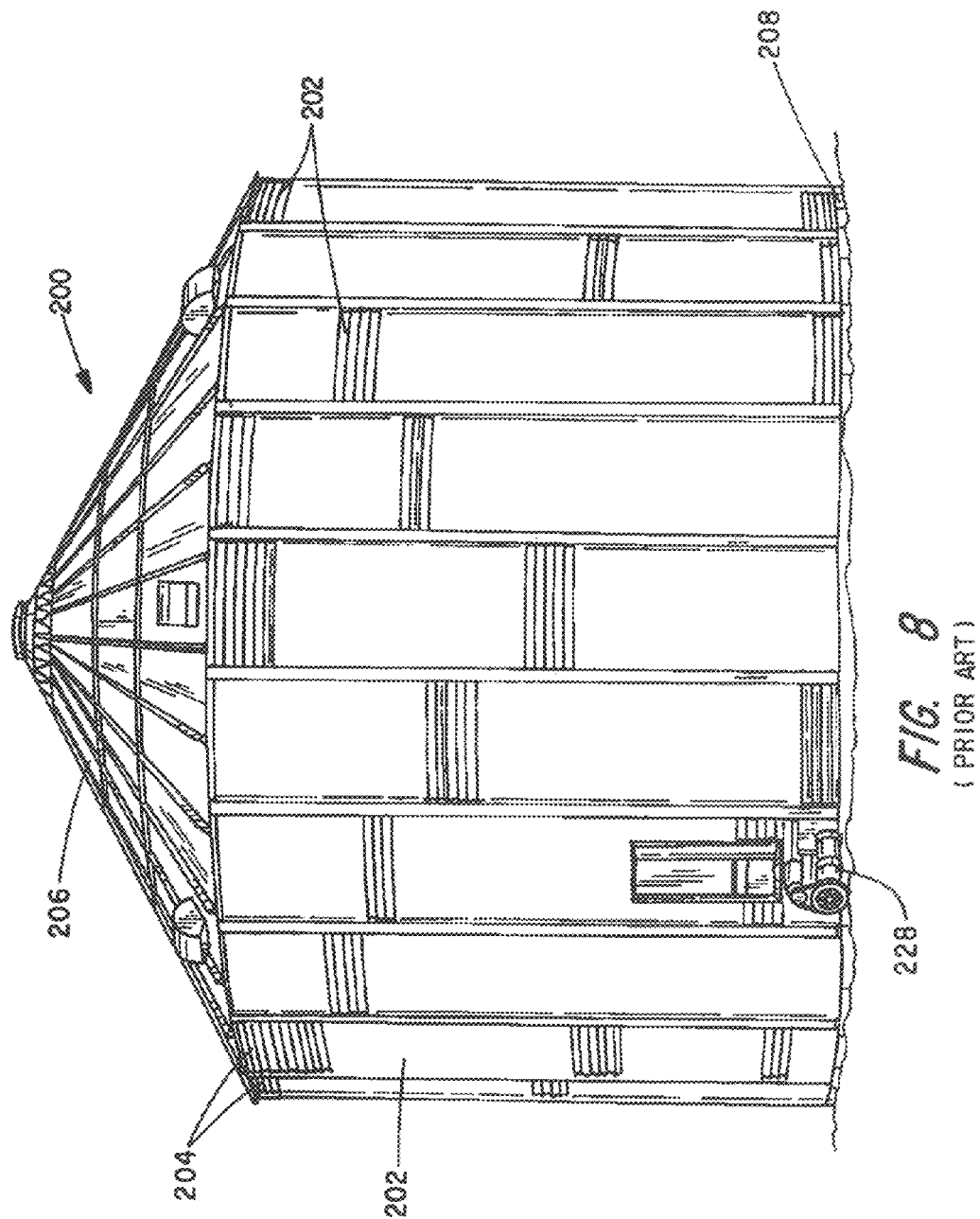
FIG. 8 is a view of a prior art grain storage bin.

FIG. 8 is a drawing of a storage bin of the type used to store corn, soybeans, wheat and related bulk agricultural products on farms and from which transport trailers like that shown in FIG. 1 are loaded when it is desired to transport same to an commercial elevator or mill for sale. The storage bin is indicated generally by reference numeral 200 in FIG. 8 and is seen to comprise a generally cylindrical structure having a corrugated steel wall 202 with vertical reinforcing ribs 204 regularly spaced about its circumference. A conical dome roof 206 covers the upper end of the wall 202. The bin 200 may rest on a concrete slab 208 and is suitably anchored to prevent strong winds from blowing it over. Agricultural storage bins may vary in diameter between about 15 feet and 50 feet and in height and from 10 feet to 80 feet and the largest such bins are capable of storing about 190,000 bushels.

The manner in which product is transferred from the bin to a trailer vehicle will next be explained with the aid of FIG. 9 which is a partial view of the interior of the bin 200 showing a floor plenum 210 that may be 12 to 18 inches above the concrete slab 208. Located between the floor plenum 210 and the slab 208 is a motor driven unloading auger assembly comprising an elongated tubular casing in which is contained a flighted unloading auger 216. It extends radially from the center of the bin 200 to a point beyond the outer wall 202. Located in the floor at the center of the bin is a center well 218 leading to the interior of the casing 214. It also contains a gear box used to transmit power from the auger shaft to a sweep 220 disposed above the floor plenum. The sweep is arranged to pivot about a vertical axis and slightly less in length than the radius of the bin. It also contains an auger for moving grain to the center wall 218.

Figure 9:
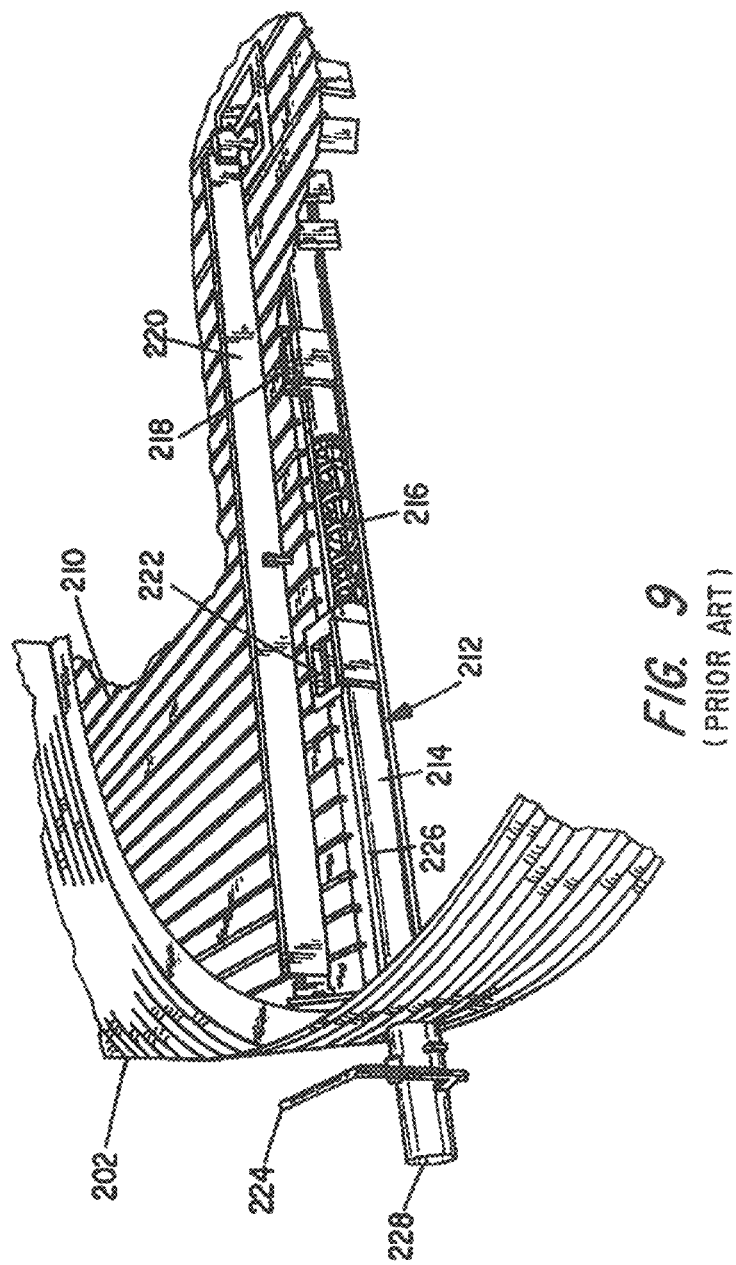
FIG. 9 is a partial perspective view of the interior of the grain storage bin of FIG. 8.
Figure 10:
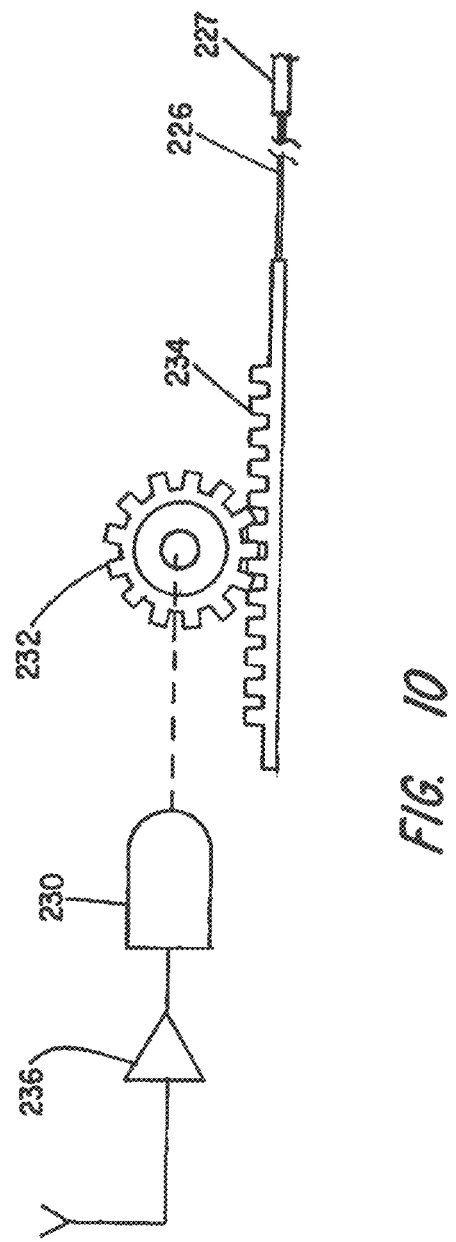
FIG. 10 is a schematic diagram of the mechanism allowing remote control of the bin's outlet slide gates.

FIG. 9 further shows an intermediate well 222 set in the floor plenum midway along the length of the auger. Both the center well 218 and the intermediate well 222 are provided with slidable gates 227 (FIG. 10) which can be moved from a position blocking entrance of grain through the respective wells to a full open position allowing maximum flow of grain from the bin into the unloading auger assembly. The slidable gates 227 can be moved from closed to full open and to any points in between from a location outside of the bin 200. Seen in FIG. 9 beyond wall 202 is a manually shiftable lever 224 that is coupled by steel rods 226 to the slidable gates 227 contained within the center well 218 and the intermediate well 222. Not shown in FIG. 9 is a vertically extending power head, also containing a separate motor-driven auger, whose input connects to the discharge end 228 of the auger assembly 212 and used to elevate the grain sufficiently high to flow out through a discharge spout into the trailer 10 through its open top (FIG. 1).

Once the bin is close to being empty such that flow due to gravity ceases leaving a pile along the wall at its angle of repose, a clutch may be manually activated to couple the sweep 220 to the motor driver auger 216 and that causes the sweep to rotate 360° about a pivot located in the center well to bring grain remaining on the floor of the bin 200 to the wells 218 and 222 for entrance into the unloading auger 216.

In accordance with the present invention the prior art bin unloading system just described is modified so that material flow from the bin and into the trailer can be controlled by an operator in the cab of the trailer tractor. Specifically, the manual lever arrangement 224 is replaced by a suitable linear actuator, such as the rack and pinion drive shown schematically in FIG. 10. A digital stepper motor 230 is used to drive a pinion gear 232 that is arranged to mesh with a rack 234 where the rack is mechanically joined to the rods 226 used to reciprocally slide the gates 227 of the wells 218 and 222. Associated with the stepper motor 230 is a controller 236 capable of receiving control signals over a wireless connection from the mobile computer in the tractor cab. That computer is programmed to initially establish a calibration routine that is effective to define codes for the "gates closed" and "gates full open" positions such that incremental positions therebetween can also be set. The controller 236 converts the codes transmitted from the cab to degrees and direction of rotation for the stepper motor 230 driving the pinion gear and thus displacement of the slide gates. Rather than utilizing a rack and pinion mechanism, those skilled in the art will recognize that equivalent linear actuator devices, both hydraulic and pneumatic, may also be employed to open and close the slide gates when appropriate changes are made to the controller used therewith.

With the slide gates 227 in the center well 218 and/or the intermediate well 222 open, and the auger drive motors for the unloading auger 216 and the power head (not shown) running, grain will be transferred from the bin into the trailer. When the driver observes on the mobile computer's display screen that his trailer is just about filled, he will send a "close" command to the controller 236 to close the slide gates 227. This is done before the augers in the system are turned off, allowing the grain remaining in the auger casings following the closing of the slide gates to be emptied there from.

Figure 11:
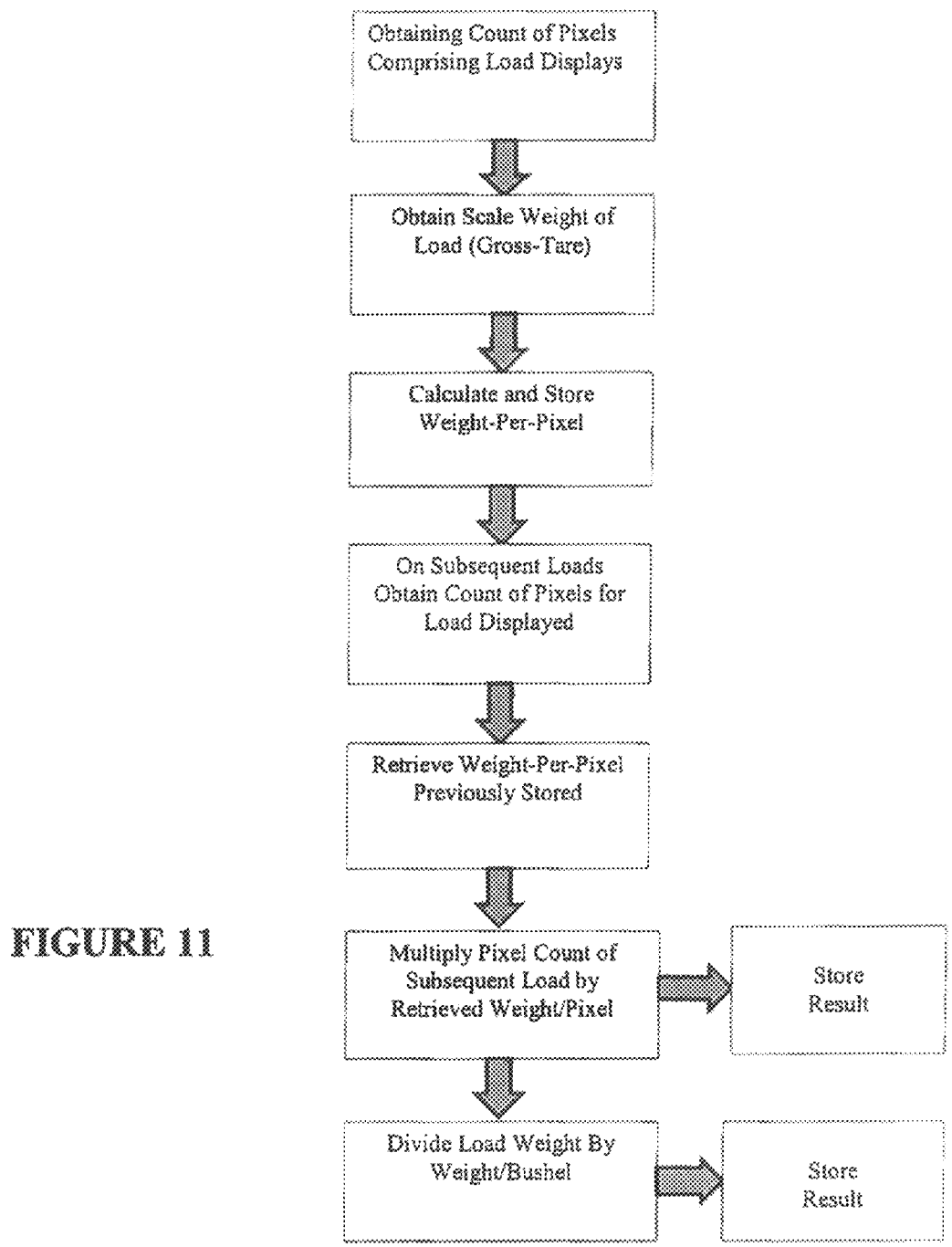
FIG. 11 is a flow chart of a method of determining weight and volume of a trailer load of grain using the system of the present invention.

The system of the present invention can further be used to measure the weight and volume of grain as it is being loaded into a grain trailer for transport or into a grain bin for storage. In this regard, reference is made to the process flow diagram of FIG. 11. Considering first the grain trailer application, a calibration step must first be performed. In calibrating the system, the trailer hoppers are filled from a grain storage bin or a harvest combine and transported to an elevator facility having a weighing scale. The net weight of the load is determined by subtracting the tare weight of the truck from the gross weight of the loaded truck. The electronic sensor system of the present invention is activated to provide a digital image of the load in the manner already explained. A pixel count can then be determined from the displayed image of the load using available software and the net weight of the load can be divided by the determined number of pixels to obtain a weight-per-pixel value that is stored in the lap top or other hand held computer employed for future reference.

Values of weight-per-bushel of various grains that are to be harvested are known. For example, a bushel of dried shelled corn is known to weigh approximately 56 pounds and a bushel of dried soybeans is known to weigh about 60 pounds. Wheat is also 60 pounds per bushel.

Now that calibration is complete, when the trailer is next loaded, its on-board sensor strips and related electronics previously described herein can again provide a digital image of the new load. Now, by the computer counting the number of pixels beneath the curve representing the top of the load and therefore covered by grain, the weight of the load can be computed by multiplying the number of pixels so counted by the stored value of the weight-per-pixel obtained at the time of calibration. From that, the volume in bushels can also be computed by dividing the total load weight by the known value of weight-per-bushel.

The ability to compute the weight and volume of subsequent loads once calibration has been done provides great advantage. As one example, when combining a corn or soybean field, the grain trailer is driven through the field at the same speed as the combine to catch the shelled corn being ejected from the combine's output auger. Built into the combine is a GPS system that can transmit precise location data to the receiver in the display computer in the truck's cab. Thus, yield from a known field area can be recorded. Smartphones and other tablet computers contain GPS receiver chips so that the driver's hand-held device can also be used to develop location information.

In addition, the computer keeps a tally of all loads transported during a defined time period with that information being stored either in the user's Smart device itself or in the cloud so as to be accessible to the farmer from multiple locations and the information capable of being emailed to interested parties. At the end of the harvest, the farmer will have a rather exact total of the volume in bushels and the weight in pounds or tons of grain produced as well as information on what field areas produced what yield.

In the case of a grain storage bin of the type shown in FIGS. 8 and 13, it comprises a right circular cylinder 250 capable of storing a volume equal to the area of the base times the height of the grain within the bin which, of course, varies as grain is being added by conveyor and allowed to enter through an opening, usually located at the center of the bin's roof, or when grain is being removed, via a slide gate controlled opening centrally located in the bin floor and leading to an auger conveyor beneath the bin floor as previously described.

To monitor the height reached by the grain flowing into or from the bin, sensor strips 60 like those shown in FIG. 5 may be affixed to steel cables suspended from the roof 256 of the bin at appropriately spaced locations where the cables extend to the floor 258. In addition, one or more temperature sensors 260 may also be suspended in the bin on the cables as at 252 and 254 and such temperature sensors may typically be spaced along the cable at 32 in. intervals which corresponds to the height of the individual rings from which the walls of the bins are commonly constructed. The temperature sensors 260 will then provide important information on the condition of grain within the bins. In this fashion, the height of the grain at the predetermined locations in the bin is sensed using the sensor strips 60 of FIG. 5 and the height of the crown is sensed by either noting the location on the cable where a difference in temperature between ambient air in the bin above the crown and temperature of the grain below the crown is detected. The optical sensors on the cable also produce an input indicative of the presence of grain at discrete levels within the bin.

As grain flows into the bin from a grain dryer, periodic samples are drawn of the flowing material and both weight and moisture content of samples are wirelessly transmitted from the sample apparatus to the computer used with the sensor strips.

Figure 12:
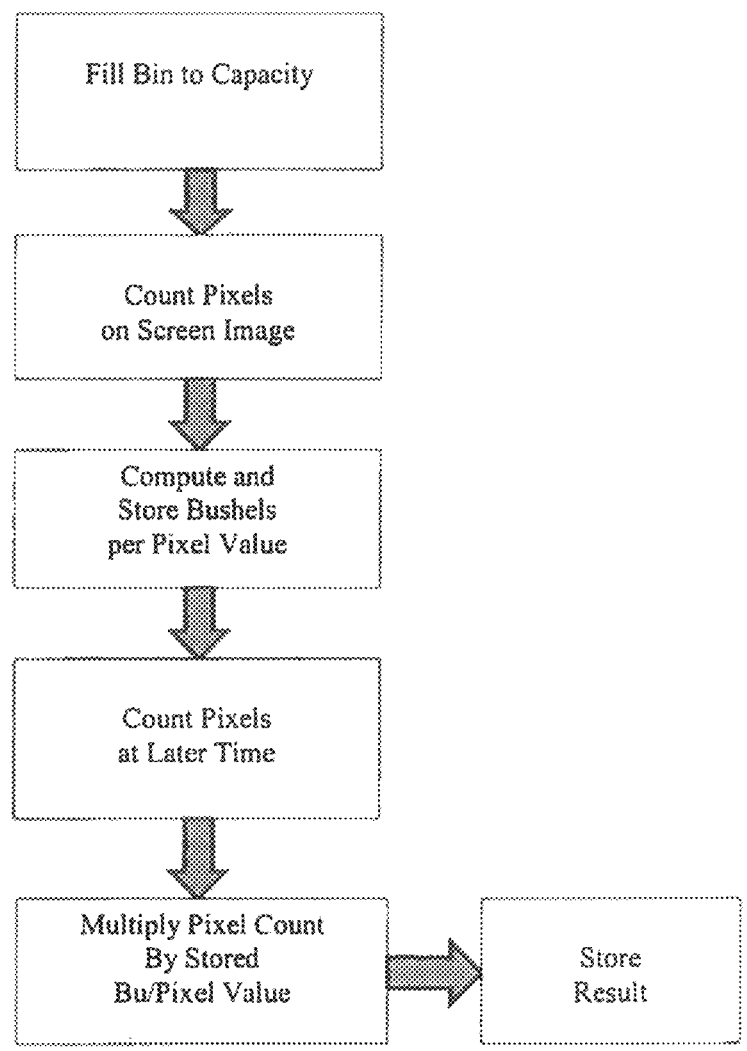
FIG. 12 is a flow chart of the algorithm for measuring the volume, temperature and moisture in a grain storage bin.

In use, and referring to FIG. 12, the grain bin monitoring system is calibrated by first loading the bin to its stated capacity and then counting the number of pixels on the display screen associated with a full bin. The volume in bushels held by the bin when filled to a known capacity becomes a known factor. Therefore, the number of bushels per pixel can be calculated and stored for future use.

Subsequently, when unknown quantity of grain has been removed from the bin and the farmer wants to know what remains, a count of the pixels of the image produced by the cable mounted sensors can be determined. Now, by multiplying that pixel count by the previously stored bushel per pixel value determined at the time of calibration, it will provide the farmer with a rather close estimate of the number of bushels of grain still remaining in the bin. Likewise, when grain is added to a partially filled bin, a similar computation can be made to determine the volume in bushels now contained. This obviates the need for the farmer to ascend ladders to the top of the bin to make a physical observation of the level of grain in the bin.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. The method for monitoring the volume of grain being stored in a grain storage bin comprising the steps of:
   (a) providing a plurality of cables of a length sufficient to reach from a support member proximate a roof to a location proximate a floor of a grain storage bin, the cables each having a plurality of proximity sensors affixed thereto at regularly spaced intervals along the length of the cables;
   (b) suspending each of the cables to a support structure disposed proximate the roof of the grain storage bin so the cables extend downward a predetermined distance toward the floor thereof at predetermined, spaced-apart locations there within;
   (c) providing an electronic circuit coupled to receive input signals from said proximity sensors and for telemetering proximity sensor state information to a remote computing and display device;
   (d) programming the remote computing and display device to compute and display at least one of a level of grain contained within the grain storage bin and a volume measured in bushels of the grain.

2. The method of claim 1 wherein the proximity sensors are photoelectric devices.

3. The method of claim 2 wherein the photoelectric devices comprise a light source and a light sensor each disposed in a light transmissive housing affixed to said cables where the housing defines a channel separating the light source form the light sensor and where entry of grain in the channel results in a change in the sensor state information.

4. The method of claim 1 and further providing moisture sensors on the plurality of cables at longitudinally spaced locations and coupled to said electronic circuit.

5. The method of claim 1 wherein the step of programming includes;
   (a) calibrating the computing and display device by counting a number of pixels in a display of a known volume of grain in the grain storage bin; and
   (b) computing and storing a bushel/pixel factor.

6. The method of claim 1 and further comprising the step of providing temperature sensors on the plurality of cables and where the electronic circuit telemeters temperature information to the remote computing and display device.

* * * * *